US005963920A

United States Patent [19]

Rose et al.

[11] Patent Number: 5,963,920

[45] Date of Patent: Oct. 5, 1999

[54] INVENTORY CONTROL SYSTEM AND METHOD

[75] Inventors: Joel S. Rose; Galen E. L. Horton, both of Overland Park, Kans.; Christopher J. Pfeffer, Kansas City, Mo.

[73] Assignee: Golconda Screw Incorporated, Kansas City, Kans.

[21] Appl. No.: 08/879,284

[22] Filed: Jun. 19, 1997

[51] Int. Cl.[6] .......... G06F 17/60

[52] U.S. Cl. .......... 705/28; 705/22

[58] Field of Search .......... 705/22, 28, 29; 235/435, 375; 364/468.01, 468.13, 468.14

[56] References Cited

U.S. PATENT DOCUMENTS

| | | | |
|---|---|---|---|
| 3,313,449 | 4/1967 | Parks . | |
| 3,674,159 | 7/1972 | Lemelson | 414/276 |
| 3,750,804 | 8/1973 | Lemelson | 414/276 |
| 4,542,808 | 9/1985 | Lloyde, Jr. et al. | 186/56 |
| 4,639,875 | 1/1987 | Abraham et al. | 364/479.06 |
| 4,783,740 | 11/1988 | Ishizawa et al. | 705/28 |
| 4,791,411 | 12/1988 | Staar | 340/568 |
| 5,201,429 | 4/1993 | Hikosaka et al. | 211/59.2 |
| 5,205,436 | 4/1993 | Savage | 221/7 |
| 5,207,784 | 5/1993 | Schwartzendruber | 221/6 |
| 5,215,421 | 6/1993 | Smith | 414/276 |
| 5,228,193 | 7/1993 | Yanagawa et al. | 29/832 |
| 5,260,690 | 11/1993 | Mann et al. | 340/572 |
| 5,305,199 | 4/1994 | LoBiondo et al. | 705/28 |
| 5,367,452 | 11/1994 | Gallery et al. | 705/28 |
| 5,404,384 | 4/1995 | Colburn et al. | 377/6 |
| 5,405,023 | 4/1995 | Murakami | 211/59.2 |
| 5,448,226 | 9/1995 | Failing, Jr. et al. | 340/825.35 |
| 5,458,536 | 10/1995 | Kargathra et al. | 453/17 |
| 5,493,491 | 2/1996 | Calcerano et al. | 705/28 |
| 5,671,362 | 9/1997 | Cowe et al. | 705/28 |

*Primary Examiner*—Emanuel Todd Voeltz
*Assistant Examiner*—Alexander Kalinowski
*Attorney, Agent, or Firm*—Shook, Hardy & Bacon LLP

[57] ABSTRACT

A method and system for managing inventory of bulk commodities from a remote location. A rack storage unit at the point of use of the parts has multiple levels each having side by side rows for storing boxes of the parts. The rows are inclined downwardly from back to front to effect gravity feeding of the boxes toward the front. Each row has plural sites which may be occupied by a box, and a sensor senses whether a box is present at or absent from each site. Electrical signals from the sensors are processed and transmitted to the parts supplier at a remote location. The supplier receives a display containing information as to which sites are occupied and which are vacant. The supplier can respond by shipping parts that are indicated to be in short supply.

13 Claims, 8 Drawing Sheets

| Row 1 | Row 2 | Row 3 | Row 4 | Row 5 | Row 6 |
|---|---|---|---|---|---|
| Row 1<br>Box 3<br>Sensor 3 - On | Row 2<br>Box 3<br>Sensor 3 - On | Row 3<br>Box 3<br>Sensor 3 - On | Row 4<br>Box 3 - Empty<br>Sensor 3 - Off | Row 5<br>Box 3 - Empty<br>Sensor 3 - Off | Row 6<br>Box 3 - Empty<br>Sensor 3 - Off |
| Row 1<br>Box 2<br>Sensor 2 - On | Row 2<br>Box 2<br>Sensor 2 - On | Row 3<br>Box 2<br>Sensor 2 - On | Row 4<br>Box 2<br>Sensor 2 - On | Row 5<br>Box 2 - Empty<br>Sensor 2 - Off | Row 6<br>Box 2 - Empty<br>Sensor 2 - Off |
| Row 1<br>Box 1<br>Sensor 1 - On | Row 2<br>Box 1<br>Sensor 1 - On | Row 3<br>Box 1<br>Sensor 1 - On | Row 4<br>Box 1<br>Sensor 1 - On | Row 5<br>Box 1<br>Sensor 1 - On | Row 6<br>Box 1 - Empty<br>Sensor 1 - Off |

Fig. 5B.

STOCK LEVELS FOR RECREATIONAL VEHICLE COMPANY, INCORPORATED

6/27/97 15:40

| | | | | | | | | | | | | | | | | | | | | |
|---|---|---|---|---|---|---|---|---|---|---|---|---|---|---|---|---|---|---|---|---|
| RACK | A | A | A | A | A | A | A | A | A | A | A | A | A | A | A | A | A | A | A | A |
| LEVEL | 1 | 1 | 1 | 1 | 2 | 2 | 2 | 2 | 3 | 3 | 3 | 3 | 4 | 4 | 4 | 4 | 5 | 5 | 5 | 5 |
| ROW | 1 | 2 | 3 | 4 | 1 | 2 | 3 | 4 | 1 | 2 | 3 | 4 | 1 | 2 | 3 | 4 | 1 | 2 | 3 | 4 |
| | | | | | | | | | | | | | | | | | | | | |
| POSITION 5 | 1 | 1 | 0 | 0 | 0 | 1 | 1 | 0 | 0 | 0 | 0 | 1 | 0 | 0 | 0 | 0 | 0 | 0 | 0 | 0 |
| POSITION 4 | 1 | 1 | 1 | 0 | 0 | 1 | 1 | 1 | 0 | 1 | 1 | 1 | 0 | 1 | 1 | 0 | 0 | 1 | 1 | 0 |
| POSITION 3 | 1 | 1 | 1 | 1 | 0 | 1 | 1 | 1 | 0 | 1 | 1 | 1 | 1 | 1 | 1 | 1 | 1 | 1 | 1 | 0 |
| POSITION 2 | 1 | 1 | 1 | 1 | 1 | 1 | 1 | 1 | 0 | 1 | 1 | 1 | 1 | 1 | 1 | 1 | 1 | 1 | 1 | 0 |
| POSITION 1 | 1 | 1 | 1 | 1 | 1 | 1 | 1 | 1 | 1 | 1 | 1 | 1 | 1 | 1 | 1 | 1 | 1 | 1 | 1 | 0 |
| | | | | | | | | | | | | | | | | | | | | |
| To Ship | 0 | 0 | 1 | 2 | 3 | 0 | 0 | 1 | 4 | 1 | 1 | 0 | 2 | 1 | 1 | 2 | 2 | 1 | 1 | 0 |
| | | | | | | | | | | | | | | | | | | | | |
| 4/23/97 5:36 | 5 | 5 | 4 | 3 | 2 | 5 | 5 | 4 | 1 | 4 | 4 | 5 | 3 | 4 | 4 | 3 | 3 | 4 | 4 | 0 |

| RACK LEVEL | A 1 1 | A 1 2 | A 1 3 | A 1 4 | A 2 1 | A 2 2 | A 2 3 | A 2 4 | A 3 1 | A 3 2 | A 3 3 | A 3 4 | A 4 1 | A 4 2 | A 4 3 | A 4 4 | A 5 1 | A 5 2 | A 5 3 | A 5 4 |
|---|---|---|---|---|---|---|---|---|---|---|---|---|---|---|---|---|---|---|---|---|
| ROW | | | | | | | | | | | | | | | | | | | | |
| PART NUMBER | 1103B1006 | 1103B1006 | 1103B1006 | 1103B1006 | 1103B1006 | 1022E1614 | 1123B1004 | 1123B1004 | 1123B1004 | 1202B040 | 1200B110 | 1022L1612 | 1022L1612 | 1143B1008 | 1022E1614 | 1201B690 | 1202-630 | 1202B288 | 1201B613 | EMPTY |
| TO SHIP | 5 | 5 | 5 | 5 | 5 | 0 | 4 | 4 | 4 | 0 | 0 | 3 | 1 | 2 | 3 | 0 | 2 | 3 | 4 | 0 |
| 3/7/97 6:53 | 0 | 0 | 0 | 0 | 0 | 5 | 1 | 1 | 1 | 5 | 5 | 2 | 4 | 3 | 2 | 5 | 3 | 2 | 1 | 0 |
| 3/6/97 6:44 | 3 | 0 | 0 | 0 | 0 | 5 | 2 | 3 | 1 | 5 | 5 | 3 | 4 | 3 | 3 | 5 | 4 | 4 | 3 | 0 |
| 3/5/97 7:55 | 0 | 0 | 0 | 0 | 0 | 5 | 2 | 4 | 1 | 5 | 5 | 4 | 5 | 3 | 3 | 5 | 4 | 4 | 3 | 0 |
| 3/4/97 18:33 | 0 | 0 | 0 | 0 | 0 | 5 | 3 | 5 | 1 | 3 | 4 | 4 | 0 | 3 | 0 | 1 | 0 | 2 | 3 | 0 |
| 3/4/97 18:32 | 0 | 0 | 0 | 0 | 0 | 5 | 3 | 5 | 1 | 3 | 4 | 4 | 0 | 3 | 0 | 1 | 0 | 2 | 3 | 0 |

INVENTORY CONTROL SYSTEM AND METHOD

FIELD OF THE INVENTION

This invention relates generally to the monitoring of inventory and deals more particularly with a method and apparatus for controlling and managing inventory of bulk commodities.

BACKGROUND OF THE INVENTION

Items that are purchased in bulk quantities are used in a wide variety of manufacturing and assembly processes. For example, screws and other fasteners, springs, clips, washers, plastic connectors and many other items are often required in large quantities. Bulk commodities of this type are typically packaged in boxes or cartons.

In the past, inventory management of bulk commodities has been approached in different ways. One technique involves the customer receiving large shipments from a supplier and storing the boxes in a warehouse area of the customer's plant. The boxes are used when needed, and the customer must either reorder regularly or closely monitor the inventory status of each part and reorder when the part is in short supply. Ordering at regular times leads to excessive inventory levels which in turn requires excessive warehouse space. Ordering only when a part is in short supply requires considerable care in monitoring the inventory level and thus involves substantial labor cost. Mistakes are not infrequent and can create significant problems if important parts are unavailable when needed.

In recent years, an inventory approach that is commonly referred to as a "just in time" practice has become more prevalent. Using this approach, the inventory levels are minimized in order to minimize warehousing requirements. However, care must be taken to avoid running out of parts at an inopportune time.

The prevalence of leaner inventory levels has led to the development of at least two different ways of controlling inventory. One technique involves storing the parts in bins on the factory floor rather than in a warehouse. Although this reduces the storage requirements at the plant, the suppliers must exercise high levels of service in order to prevent shortages. Typically, it is necessary for suppliers to set up satellite warehouses near the facilities of the customer, and personnel employed by the supplier must closely monitor and service the inventory to maintain it at a low level while still always maintaining a sufficient supply on hand. Essentially, this simply shifts the warehousing and staffing needs from the customer to the supplier.

A second way of controlling inventory under a just in time approach makes use of encoding techniques to monitor inventory levels. The boxes of parts are provided with encoded labels which are scanned and entered into inventory when they are shipped to and reach the facilities of the customer. When the encoded boxes are withdrawn from inventory and used, they are scanned again so that the information as to the inventory level is kept current. This information can be used by the supplier to replenish the stock as necessary.

One problem with all of these approaches is that they are unable to respond quickly and reliably to events that can create inventory stock losses. For example, parts can be misplaced and are thus unavailable for use even though the inventory system indicates that they are present in inventory. Failure to scan boxes that are used also results in erroneous information in the inventory system. Parts can be used improperly in an application that calls for a different part, thus rapidly depleting the incorrect parts before they can be replenished. Errors or deliberate sabotage can cause all of these problems and others as well. Increasing reliance on the supplier for inventory control and lack of quick response times can result in failure of the inventory system and serious problems in the efficiency of the manufacturing operation.

SUMMARY OF THE INVENTION

The present invention is directed to an improved method and system for inventory control which avoids the need for satellite warehousing and excessive employee costs while minimizing inventory stock losses and providing fast response times.

In accordance with the invention, bulk commodities such as screws are supplied in boxes or cartons which are all the same size even though different parts may be packaged in them. The boxes are stored at or near the point of use in rack storage units arranged to provide a number of side by side rows which are located on the rack at a number of different levels. Each individual row holds a number of boxes which all contain the same part that is associated with that row. The racks are gravity fed so that all of the boxes in each row are maintained in the front positions in the row one behind the other. Each position or site in each row is provided with a sensor which senses whether the site is vacant or occupied by a box.

The sensors generate signals which are processed and transmitted by a modem or otherwise to the remote facility of the supplier of the parts. A graphic screen display at the supplier location provides an instantaneous picture of the inventory status at the customer's facility. Parts that are low can be sent with the next shipment, and those that are in sufficient supply can wait for later shipment at such time as they are needed.

The supplier can thus monitor the instantaneous inventory status of a remotely located customer and can maintain the inventory status at a relatively low level while assuring that parts are available when needed. Historical knowledge as to how many parts are used in a given time period allow the supplier to note any abnormalities in part use so that the customer can be alerted and can take steps to determine the reason for the abnormal usage. Low but adequate levels of inventory can be maintained without the personnel of either the customer or supplier being required to regularly check the stock levels at the site of the customer's plant. In addition, the problems of encoded labeling are avoided, and up to the minute stock levels are available to the supplier at any time.

BRIEF DESCRIPTION OF THE DRAWINGS

In the accompanying drawings which form a part of the specification and are to be read in conjunction therewith and in which like reference numerals are used to indicate like parts in the various views:

FIG. 7 is a diagrammatic view showing a screen display of a typical inventory level which is available at the location of the supplier of parts; and FIG. 8 is another typical screen display informing the supplier which parts to ship in what volume in accordance with the current inventory status.

DETAILED DESCRIPTION OF THE INVENTION

Figure 1:
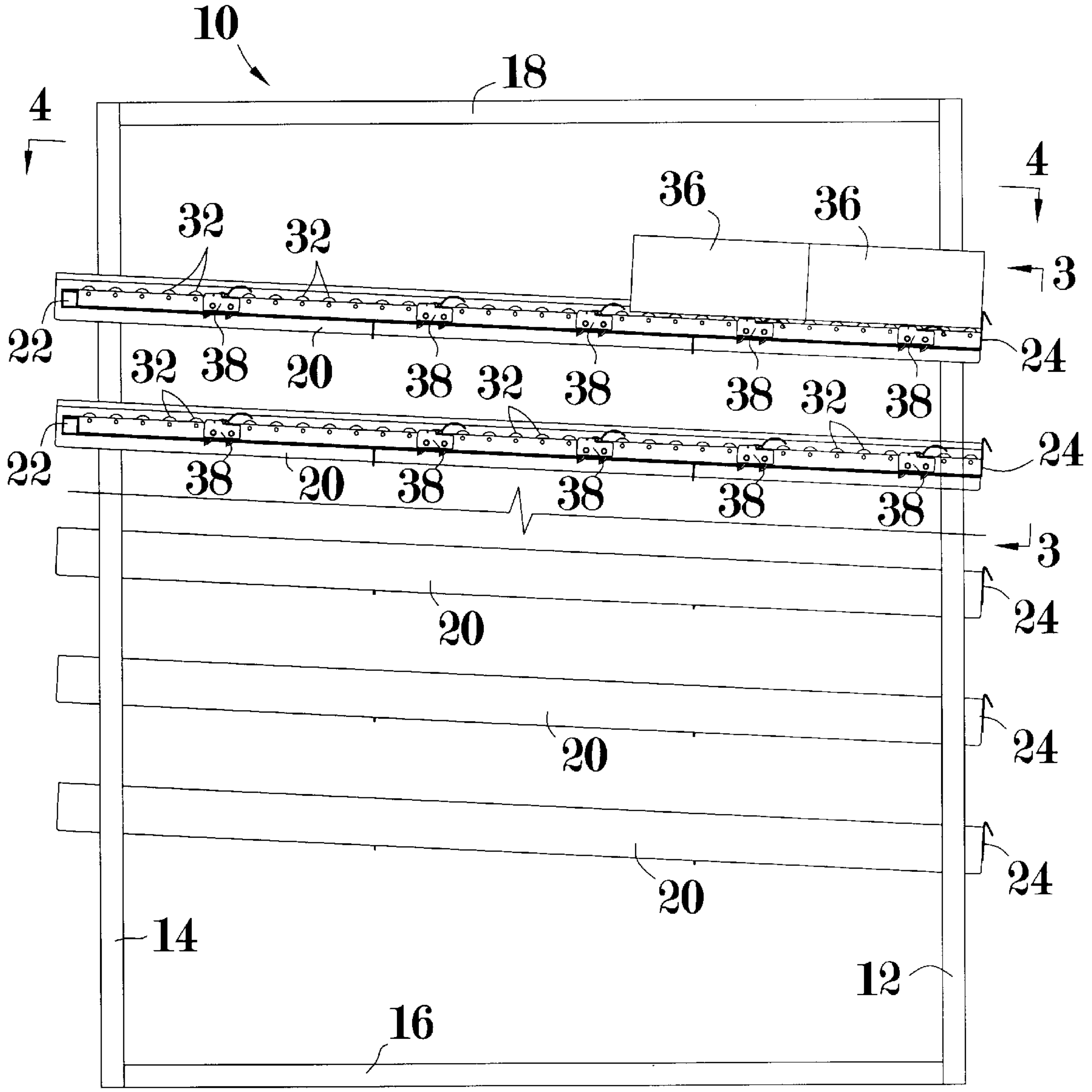
FIG. 1 is a diagrammatic side elevational view of a storage rack unit which may be used with an inventory control system constructed in accordance with a preferred embodiment of the present invention.

Referring now to the drawings in detail and initially to FIGS. 1–4, numeral 10 generally designates a gravity feed storage rack which may be used as part of the inventory control system of the present invention. The storage rack 10 includes a pair of front posts 12 and a pair of rear posts 14, all of which are upright members. On each side of the rack, the front and rear posts 12 and 14 are connected at their bottom ends by bars 16 and at their top ends by additional bars 18.

Figure 4:
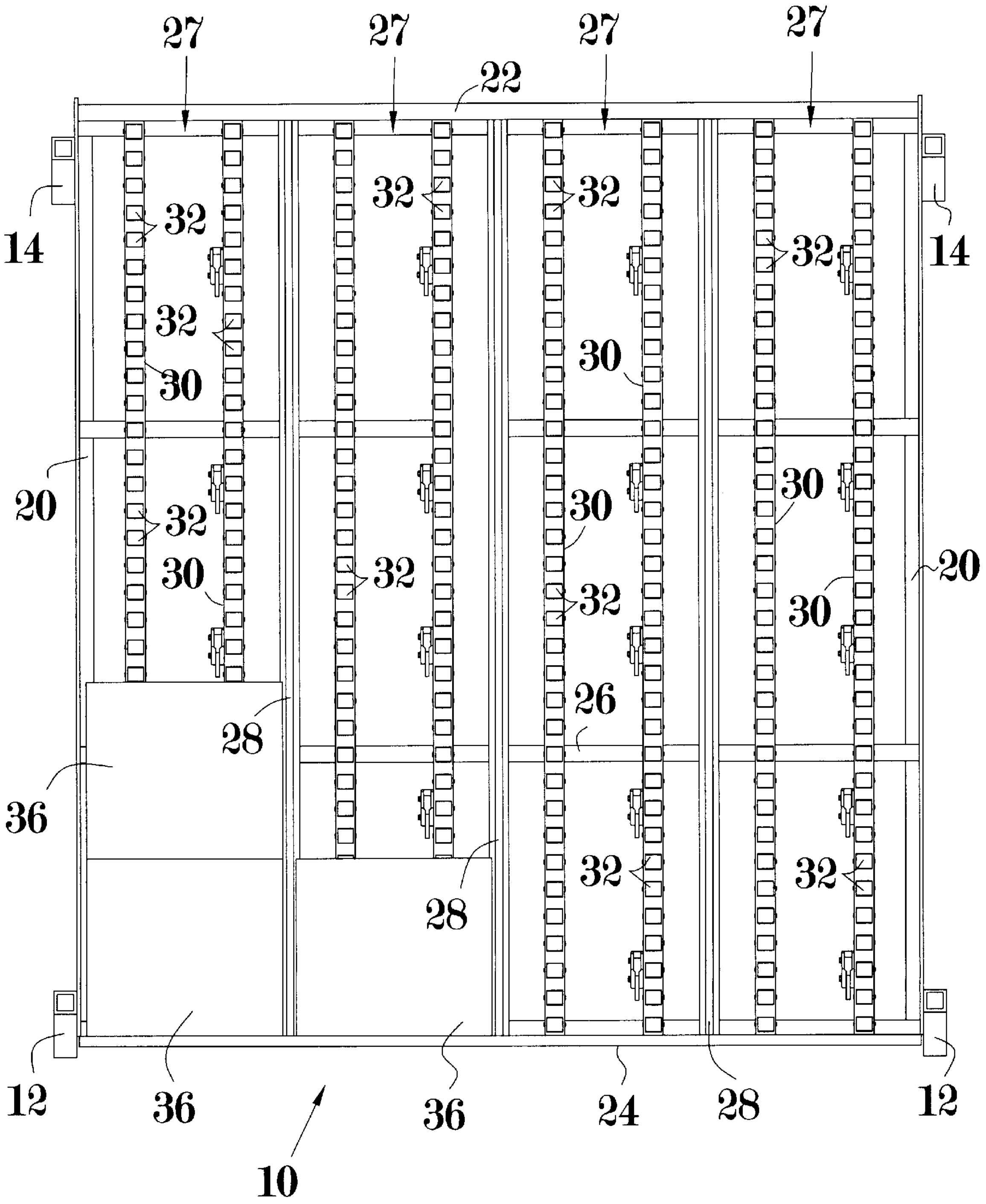
FIG. 4 is a fragmentary plan view taken generally along line 4—4 of FIG. 1 in the direction of the arrows.

The rack 10 is divided into a number of different levels. At the location of each level, side members 20 extend on each side of the rack between the front and back posts 12 and 14. Members 20 incline downwardly from back to front as best shown in FIG. 1. With reference to FIG. 4 in particular, a transverse bar 22 extends between the back ends of each pair of members 20 in each level. Each level of the rack is provided at its front: end with a transverse plate 24 which extends between the front ends of the members 20 at the location of the front post 12. Each level is provided with a pair of intermediate transverse members 26 which extend between intermediate portions of each pair of members 20.

As best shown in FIG. 4, each of the levels of the storage rack 10 is divided into a number of side by side rows 27 which extend from the back of the rack to the front of the rack between members 22 and 24. In the illustrated embodiment shown in FIG. 4, there are four of the rows 27 in each level. The adjacent rows are separated from one another by three dividers 28 which extend between the front and back bars 22 and 24. The dividers 28 are also supported on the cross bars 26.

Figure 2:
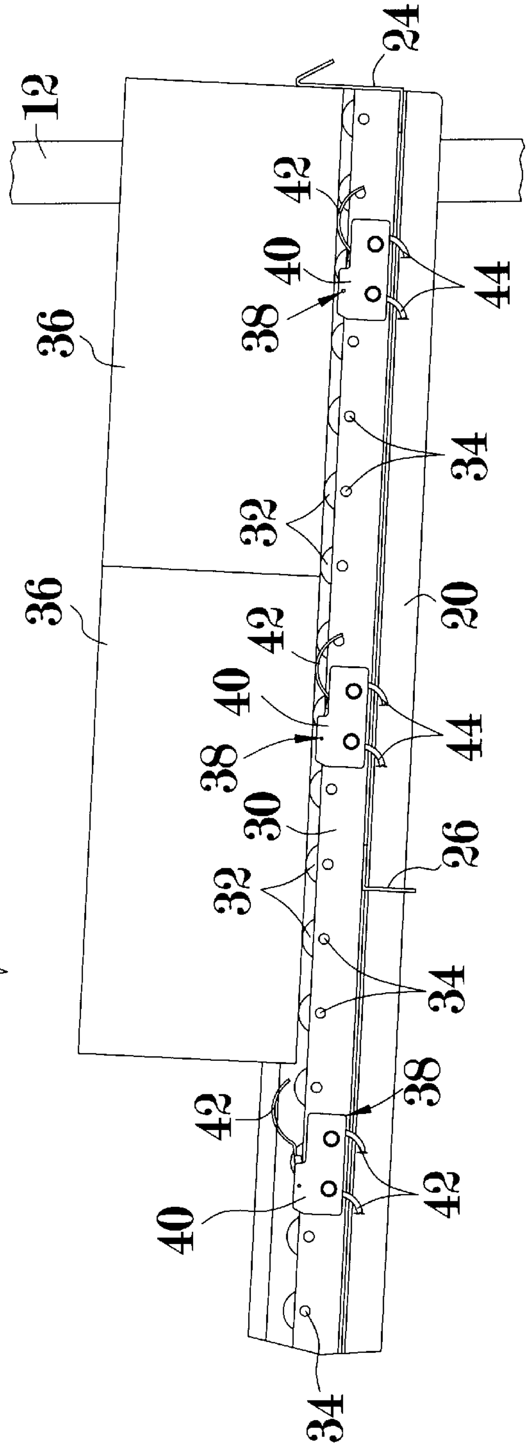
FIG. 2 is an enlarged fragmentary side elevational view of a part of one row of the storage rack.
Figure 3:
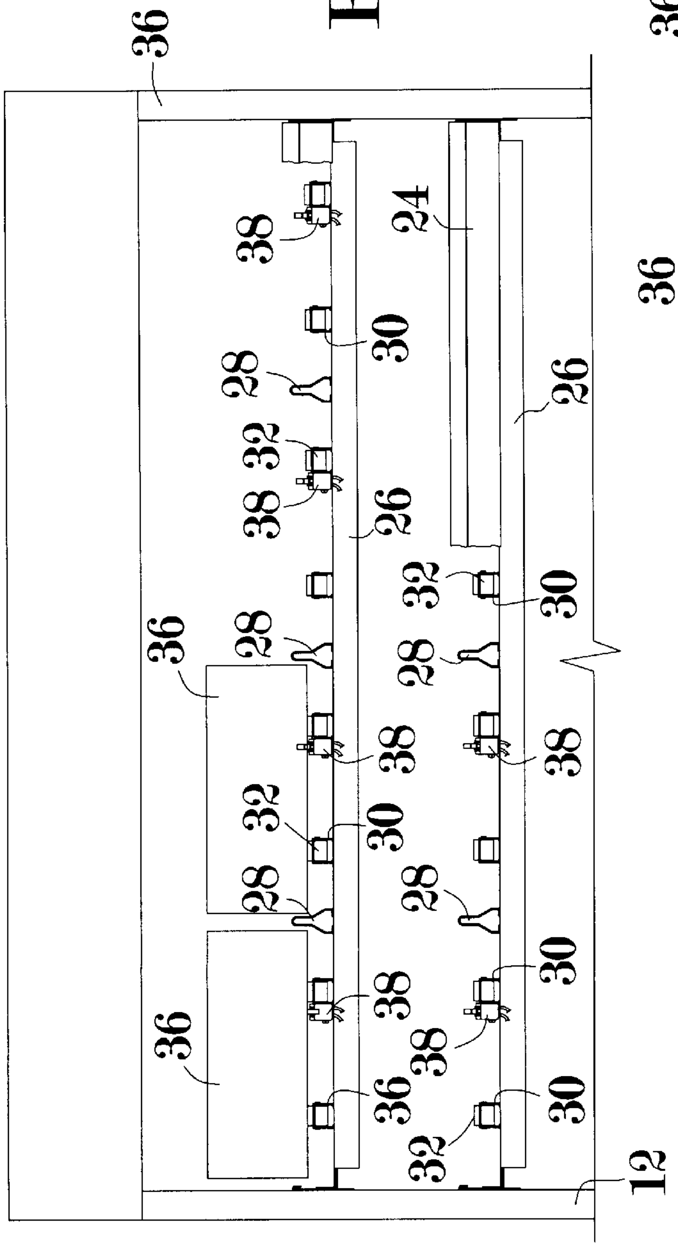
FIG. 3 is a fragmentary sectional view taken generally along line 3—3 of FIG. 1 in the direction of the arrows.

Each of the rows 27 is provided with a pair of parallel channels 30, each of which is in turn provided with a plurality of rollers 32. As shown in FIG. 4, the channels 30 are parallel to one another and extend between the back and front members 22 and 24 parallel to the dividers 28. The channels 30 in each pair are spaced apart near the opposite sides of the row and extend along the entire length of the row. As best shown in FIG. 2, each of the rollers 32 is mounted on its channel 30 for rotation about a horizontal axle 34. The top portions of the rollers 32 extend upwardly above the upper edges of the sides of the channels 30. Accordingly, cartons or boxes 36 which contain bulk commodities such as screws ride on the rollers 32 when the boxes 36 are loaded into the storage rack 10. The dividers 28 maintain the boxes in the rows that they are loaded into.

The boxes 36 are all the same size, although boxes which are loaded into different rows usually contain different items or items which differ in their size or type. However, all of the boxes which are loaded into any one of the rows contain the same items. Each box has a width slightly less than the width of the row which is defined between the dividers 28 for the two middle rows and between the side members 20 and the adjacent dividers 28 for the two rows adjacent the sides of the rack. The boxes have a height so that they can be accommodated at any of the levels in the storage rack 10.

In each row, one of the channels 30 is provided on one of its sides with a plurality of switches 38 which serve as sensors to sense the presence or absence of one of the boxes 36 at the inventory site corresponding to the switch. As best shown in FIG. 2, each of the switches 38 has a housing 40 which is secured to the side of channel 32 and a curved switch arm 42 which projects out of the housing 40. Each of the switch arms 42 is urged upwardly by a spring or similar mechanism (not shown) located within the housing 40. Normally, the switch arms project upwardly above the tops of the rollers 32, the position shown for the left most switch arm 42 in FIG. 2. In this position, the switch 38 is in an “off” position where an electrical circuit is interrupted between a pair of wires 44 which extend into the switch housing 40. Thus, each sensor is in an off condition when the corresponding site is vacant, because the switch arm 42 is then maintained in the extended position.

When a box 36 is positioned in the inventory site corresponding to one of the switches 38, the switch arm 42 of the switch is depressed by the box 36 which is positioned on the rollers 32. This is the position shown for the two right most switch arms 42 in FIG. 2. In this condition of the sensor, a circuit is completed between the two wires 44, and this completion of the circuit results in the sensor being “on”, thus indicating that the site is occupied.

The switches 38 are spaced apart along the length of each row such that there is one switch corresponding to each possible site of a box 46 in the row. Preferably, the switches are spaced apart from one another a distance slightly greater than the length dimension of each box 36 handled by the system, so that the box cannot span two adjacent switches and depress both of the adjacent switch arms at the same time.

With this construction of the storage rack 10 and the spacing and arrangement on the switches 38, the rack is provided with a number of levels (five levels in the illustrated embodiment), each including a number of parallel rows (four rows in each level in the illustrated embodiment), with each row having a number of box locations or sites located one behind the other along the row (five sites in each row in the illustrated embodiment). At each site which is occupied by one of the boxes 36, the corresponding switch arm 42 is depressed by the box to place the corresponding sensor in the on condition, thus providing a signal through the wires 44 that is indicative of the presence of a box at the site. At each site that is vacant, the switch arm 42 is not depressed, and the switch is in an off condition. Again, this provides a signal through the wires 44 indicating that the corresponding site is unoccupied.

It should be noted that each storage rack 10 can have virtually any desired number of levels, virtually any desired number of rows in each level, and virtually any desired number of sites in each row. Bulk commodity items such as screws are contained in the boxes 36. It should also be understood that sensors other than the switches 38 can be used, so long as the sensors are able to provide a signal indicating whether each site is occupied or vacant.

Figure 5A:
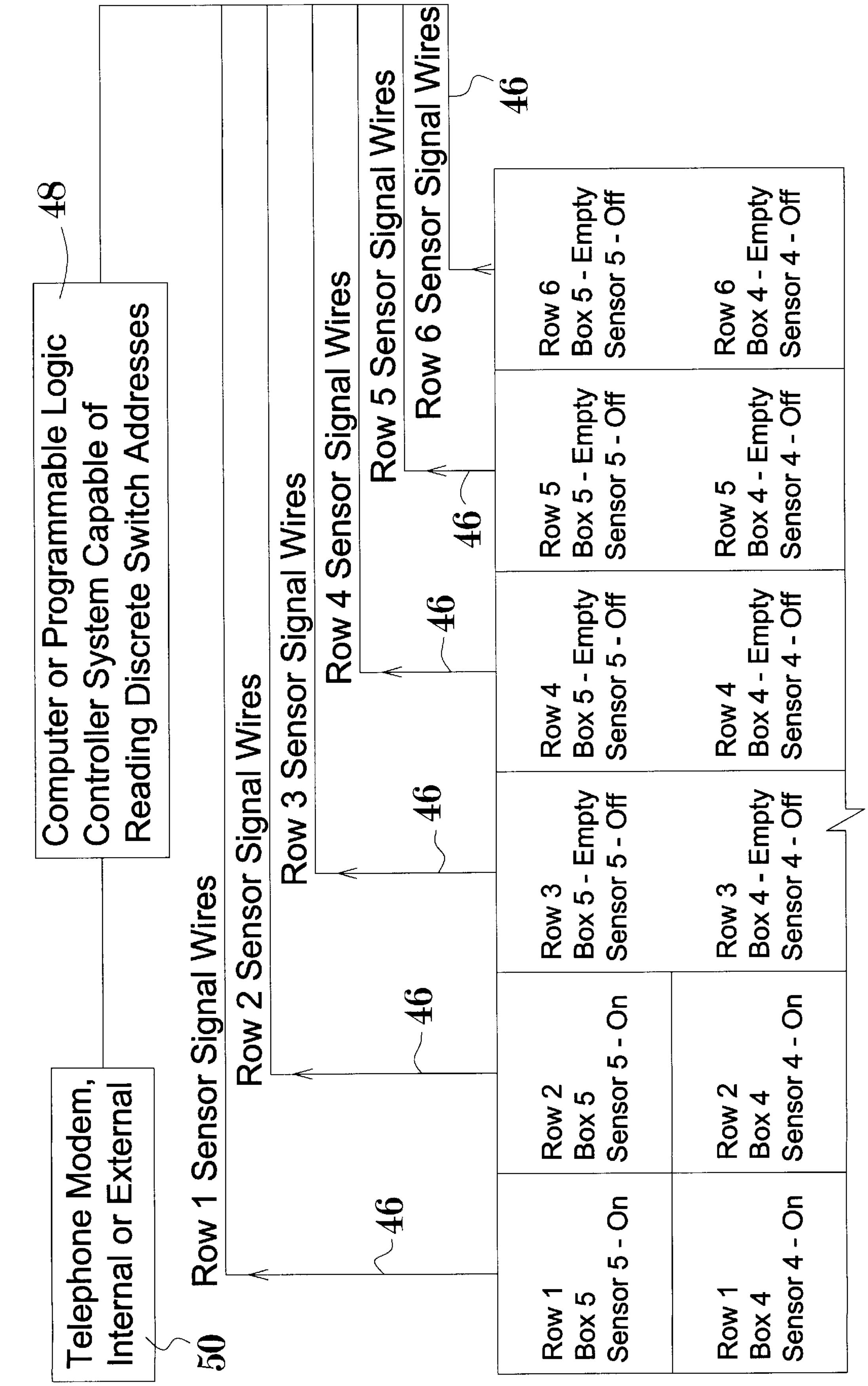
FIG. 5 is a diagrammatic view of the sites in one level of the storage rack showing how the sensor signals are processed.

FIG. 5 shows diagrammatically one level of a storage rack having six rows in each level with five box sites in each row.

The rows are numbered from left to right, and the sites in each row are numbered from front to back. The rack level depicted in FIG. 5 has rows 1 and 2 completely full, with each site occupied by a box and each of the sensors being placed in the on condition by the presence of a box. Row 3 has only 3 boxes, and they are located in sites 1, 2 and 3 which are the three sites located nearest the front of the rack due to the gravity feeding of the boxes toward the front that results from the incline of each row. Row 4 is occupied by only two boxes which are again located in the two sites nearest the front of the row. Row five has only one box, and it is located in site number 1 which is nearest the front of the unit. There are no boxes present in row six.

With continued reference to FIG. 5 in particular, each row has a wire bundle 46 which contains the signal wires 44 for the switches 38 associated with the sites in that row. Thus, in the arrangement shown in FIG. 5, each level has six different wire bundles 46 which correspond to the six rows in each level. Each bundle 46 contains all of the wires 44 for the switches in that row.

All of the wire bundles 46 for the entire rack connect with a computer or another type of programmable logic controller which is identified by numeral 48 in FIG. 5. The controller 48 is programmed to read the on or off status of each switch 38 and to associate the switch status with the address of the site, thus determining for each site on the storage rack 10 whether a box 36 is present or not. The information stored by the controller 48 may be transmitted by a modem 50 for use at a remote site, as will be explained more fully.

Figure 6:
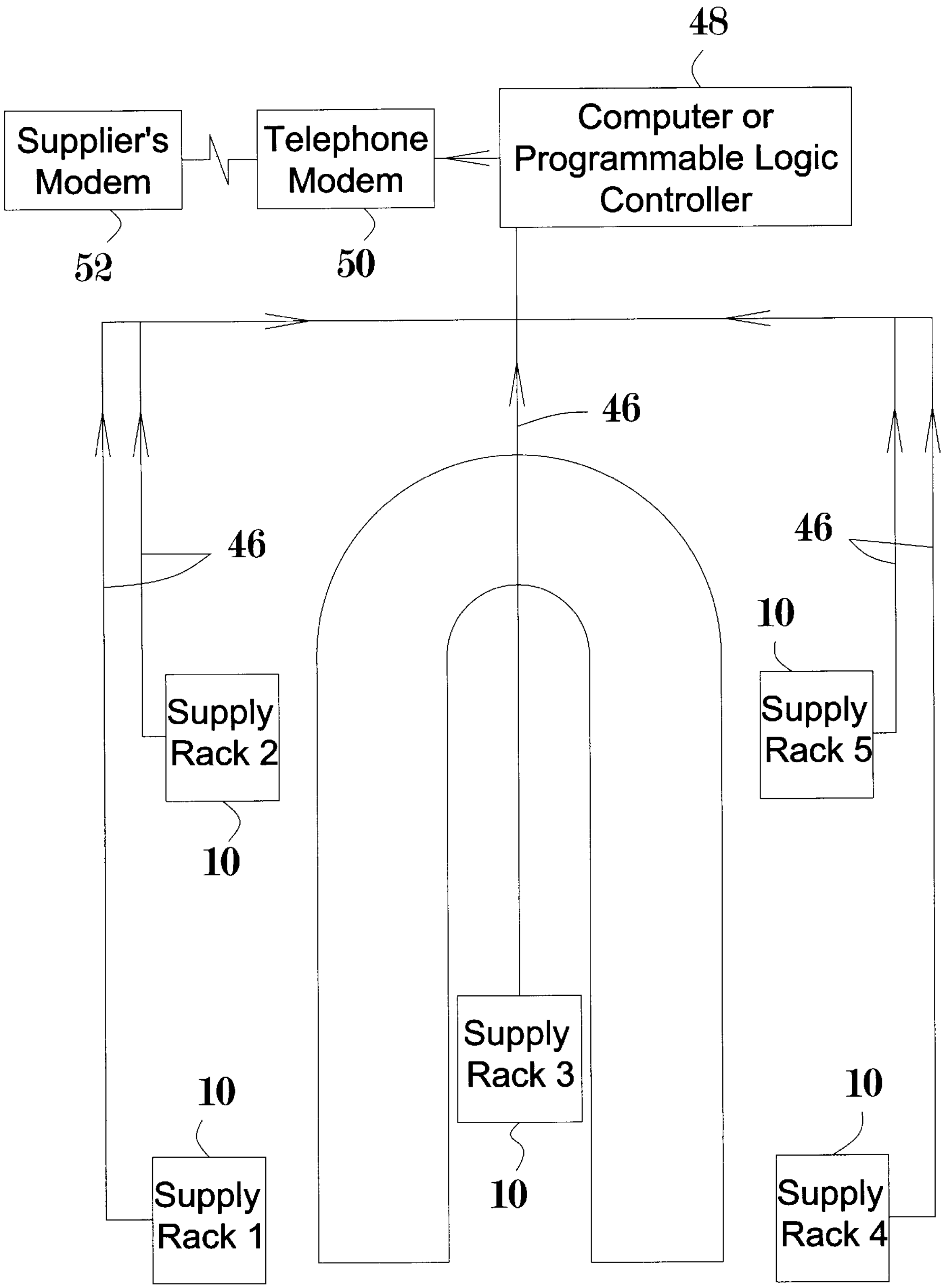
FIG. 6 is a diagrammatic view showing a number of storage racks arranged at the point of use near an assembly line and depicting schematically how the sensor signals are processed and transmitted.

FIG. 6 schematically depicts an assembly line operation to which the inventory control system of the present invention is applicable. An assembly or manufacturing operation includes an assembly line 51 on the plant floor. A number of the storage racks 10 are located on the floor at or near the assembly line near the point of use of the parts stored in the racks. Each rack is numbered differently as depicted in FIG. 6, and the racks are thus distinguishable from one another. The controller 48 receives electrical signals from all of the racks 10 and thus receives information as to whether each site in each rack is occupied or vacant. This information is transmitted by the modem 50 at the facility of the assembly line operation to a supplier's modem 52 which may be located in a different city or state or otherwise remotely from the location of the assembly line. The supplier, through use of its modem 52, can interrogate the controller 48 through modem 50 in order to determine at any time or at regular intervals the instantaneous status of each site in each storage rack.

As shown in FIG. 7, the information received at the facility of the supplier can, through the use of suitable software, be graphically displayed in a grid format on a computer screen 54. Each storage rack is assigned a unique identification symbol such as the letter A for the first rack in the example of FIG. 7. Each level is given a number beginning with number 1 for the lowest level and continuing to level five at the highest level of a five level rack. Each row is given a number starting with number 1 for the left row in each level and continuing to number 4 for the right row in a four row storage rack. Each site in each row is assigned a number, beginning with number 1 for the front site and continuing to number five for the rear site in a five site row. The grid display thus depicts each site as a grid unit and indicates directly on each grid unit the status of the site.

In the example shown in FIG. 7, row All (rack A, level 1, row 1) displays a "1" at each site or position, thus indicating that the sensor is "on" due to the presence of a box at each site in that row. Similarly, each site in each row is designated with either a "1" (site occupied by a box) or a "0" (site vacant). The overall display shown in FIG. 7 provides the supplier with the current status of the inventory in each row in each rack at the customer's facility. The "to ship" row near the bottom of the display indicates the number of boxes for each row that would be required to be shipped to the customer in order to completely fill the row. For example, position A54 (rack A, level 5, row 4) is completely empty of boxes, so 5 boxes would be needed to be shipped to the customer to completely fill that row. Similarly, the display includes a bottom row which represents a tally of the total number of boxes that are present in each row.

The numbers in the display of FIG. 7 can be color coded to alert the supplier to the inventory situation. For example, rows that are empty or nearly empty can be highlighted with red numbers to identify a situation of short supply. Rows that are full or nearly full can be highlighted with green numbers to indicate the safe status of the row. Rows that are neither full nor nearly depleted can have their numbers highlighted in blue to inform the supplier of that status.

Each row in the system has parts that are all the same, and this row is preassigned with a unique part number. FIG. 8 depicts a display that may be provided on the computer screen of the supplier through implementation of suitable software. Below each row on the display, a part number is displayed that corresponds to the part held in that row. From the information that is provided by the system, the number of boxes that are to be shipped to replenish the row is displayed below the part number, thus allowing the part supplier to locate and ship the proper boxes to the customer.

FIG. 8 also provides at the bottom a display of the number of boxes in each row during the previous several days. This provides historical information as to how each particular part is being used at the customer's facility, and this information can be valuable both to the supplier and to the customer. For example, it indicates which parts are used most quickly and thus need to be supplied at frequent intervals. It can also provide information showing abnormal use of a particular part which allows the customer to take steps to determine the reason for the abnormality.

In use of the system, the storage rack or racks 10 are supplied with boxes 36 which are loaded into the proper locations of the rack. It is contemplated that each box will be stamped with a part number or other indication which corresponds to a similar indication applied to the row in the storage rack which is to receive that particular part. The boxes are inserted from the rear into the proper rows and automatically move forwardly as far as possible due to the downward slopes of the rows from back to front. The front box in each row rests against the front member 24 which acts as a stop and positions the box with its center located near the corresponding switch 38. The box that is next loaded into the row moves downwardly along the rollers 32 and rests against the back of the immediately preceding box as shown in FIGS. 1 and 2. Additional boxes which are loaded into the row similarly move downwardly against the back end of the immediately preceding box. Each box 36 depresses the arm 42 of the switch 38 that: it overlies.

As the boxes 36 are needed, they are removed from the front end of the storage rack. This requires them to be lifted up over the front member 24 and withdrawn forwardly out of the row that contains them. The remaining boxes in the row then roll toward the front due to the gravity feed system. Each time one of the boxes is withdrawn from inventory, a site becomes vacant in the row from which the box was removed. The additional site that becomes vacant is the rearmost site that was previously occupied by a box. The change in status from on to off of the switch 40 for the now vacant space is transmitted electrically to the controller 48. The information as to the current status of each site is maintained in the controller 48 and may be obtained at any time from the remote location of the supplier through use of modems 50 and 52. The current status of the inventory can be displayed in the manner shown in FIG. 7, and a display such as that depicted in FIG. 8 can be called up when products need to be shipped from the supplier to the customer.

When reordered parts reach the customer, the boxes that contain them are loaded into the appropriate rows from the back end, and they automatically occupy the sites that are available from front to rear. The change in status is detected by the sensor switches 38 and is transmitted to the controller 48 where it is at all times available to the supplier.

The "on" or "off" electrical signals on the wires 44 can be processed by the controller 48 using well known techniques and software that those skilled in the art can easily apply. Likewise, transmission of information via modems is easily carried out. The techniques and software used at the supplier location to graphically display the inventory status are also well within the capabilities of those having ordinary skill.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

Having thus described the invention, we claim:

1. Inventory management apparatus for use by a supplier of items to a user that stores the items for use at a user location remote from the supplier location, said apparatus comprising:

a gravity feed storage rack providing a plurality of rows each having a plurality of sites at which an item may be located, each row being inclined downwardly from a loading end to a removal end to effect gravity feeding of items present in the row toward the sites nearest the removal end;

a sensor for each site sensing the presence or absence of an item at the corresponding site;

means for providing a signal as to whether an item is present at or absent from each site;

means for transmitting said signals to the supplier location; and means at the supplier location for providing an indication of the presence or absence of an item at each site based on the signals, thereby enabling the supplier to supply to the user items that are in short supply.

2. Apparatus as set forth in claim 1, wherein said rack is constructed to arrange said rows generally side by side.

3. Apparatus as set forth in claim 1, wherein said rack is constructed to arrange said rows generally side by side in a plurality of different levels located one above the other.

4. Apparatus as set forth in claim 1, including a stop adjacent the removal end of each row to maintain the item at the adjacent site until removed therefrom.

5. Apparatus as set forth in claim 1, including roller means for each row for facilitating movement of the items therein toward the removal end.

6. Apparatus as set forth in claim 1, including a plurality of rollers supported for rotation and spaced along the length of each row, said rollers receiving the items thereon and acting to assist in feeding of the items toward the removal end of each row.

7. Apparatus as set forth in claim 1, wherein said means at the supplier location includes means for graphically displaying each site in each row and displaying at each site whether an item is present there.

8. Apparatus for monitoring the inventory status of items packaged in containers and used at a user location remote from a location of a supplier of the items, said apparatus comprising:

a gravity feed storage rack providing a plurality of rows arranged generally side by side and occupying a plurality of different levels, each row being inclined downwardly from one end at which containers are loaded into the row to another end at which containers are removed from the row;

a plurality of different sites in each row at which a container may be present, the incline of each row feeding the containers therein toward the sites nearest said other end;

a sensor for each site acting to sense the presence or absence of a container there, each sensor providing a signal indicating whether a container is present at or absent from the corresponding site; and means for transmitting said signals to the supplier location to provide information there as to the inventory status of the containers in each row.

9. Apparatus as set forth in claim 8, including means at the supplier location for displaying the inventory status of the containers in each row.

10. Apparatus as set forth in claim 9, wherein said means at the supplier location includes:

a screen;

means for displaying on said screen a grid pattern having individual grid units corresponding to the sites in the rows and levels; and means for displaying at each grid unit a symbol indicating whether there is or is not a container present at the corresponding site.

11. Apparatus as set forth in claim 8, including a plurality of rollers supported for rotation and spaced along each row to receive the containers thereon and assist in feeding the containers toward said other end of the row.

12. Apparatus as set forth in claim 11, including a stop at said other end of each row to maintain the containers in the sites adjacent said other ends until removed therefrom.

13. Apparatus as set forth in claim 8, including a stop at said other end of each row to maintain the containers in the sites adjacent said other ends until removed therefrom.

* * * * *